United States Patent Office 3,192,949
Patented July 6, 1965

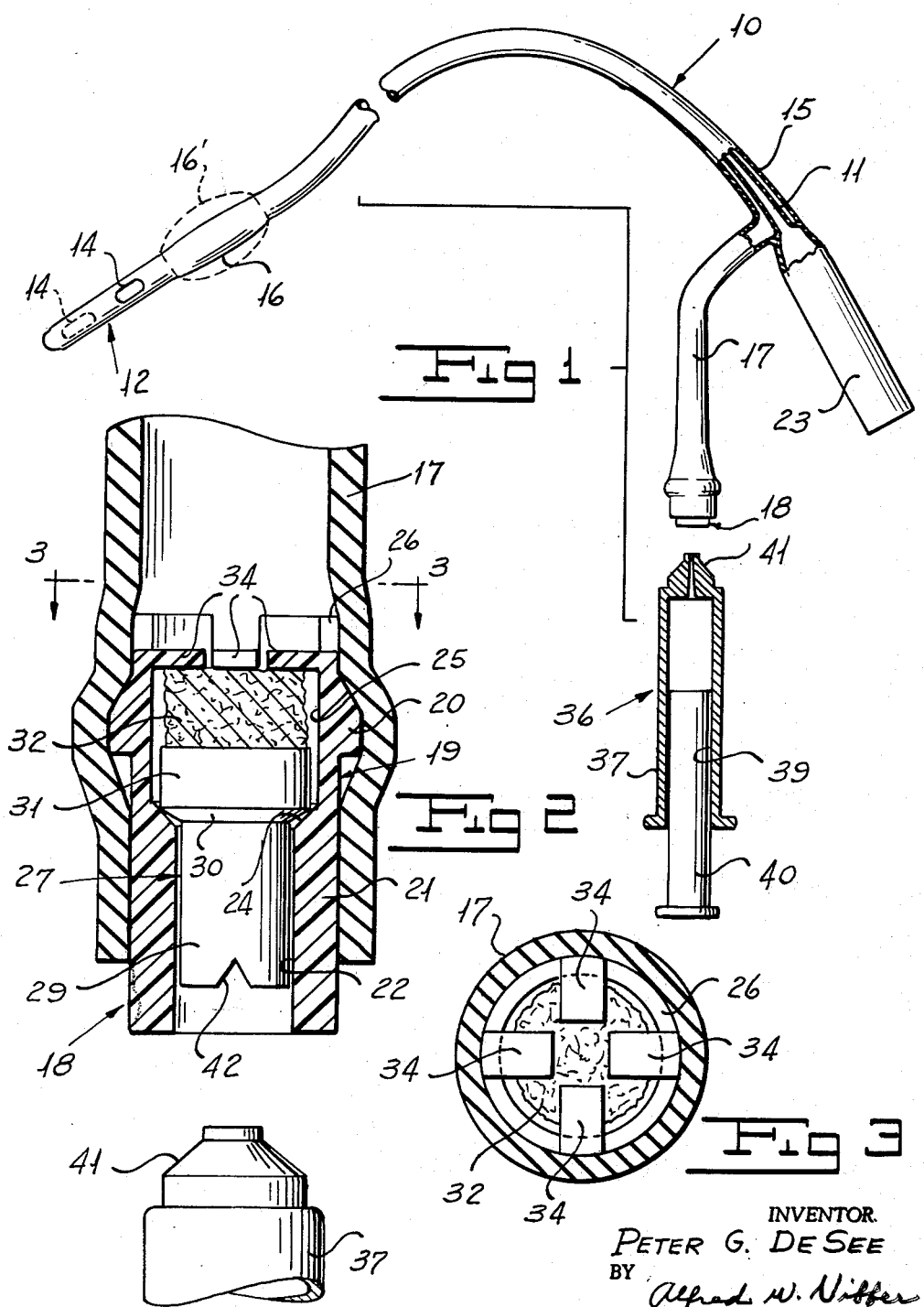

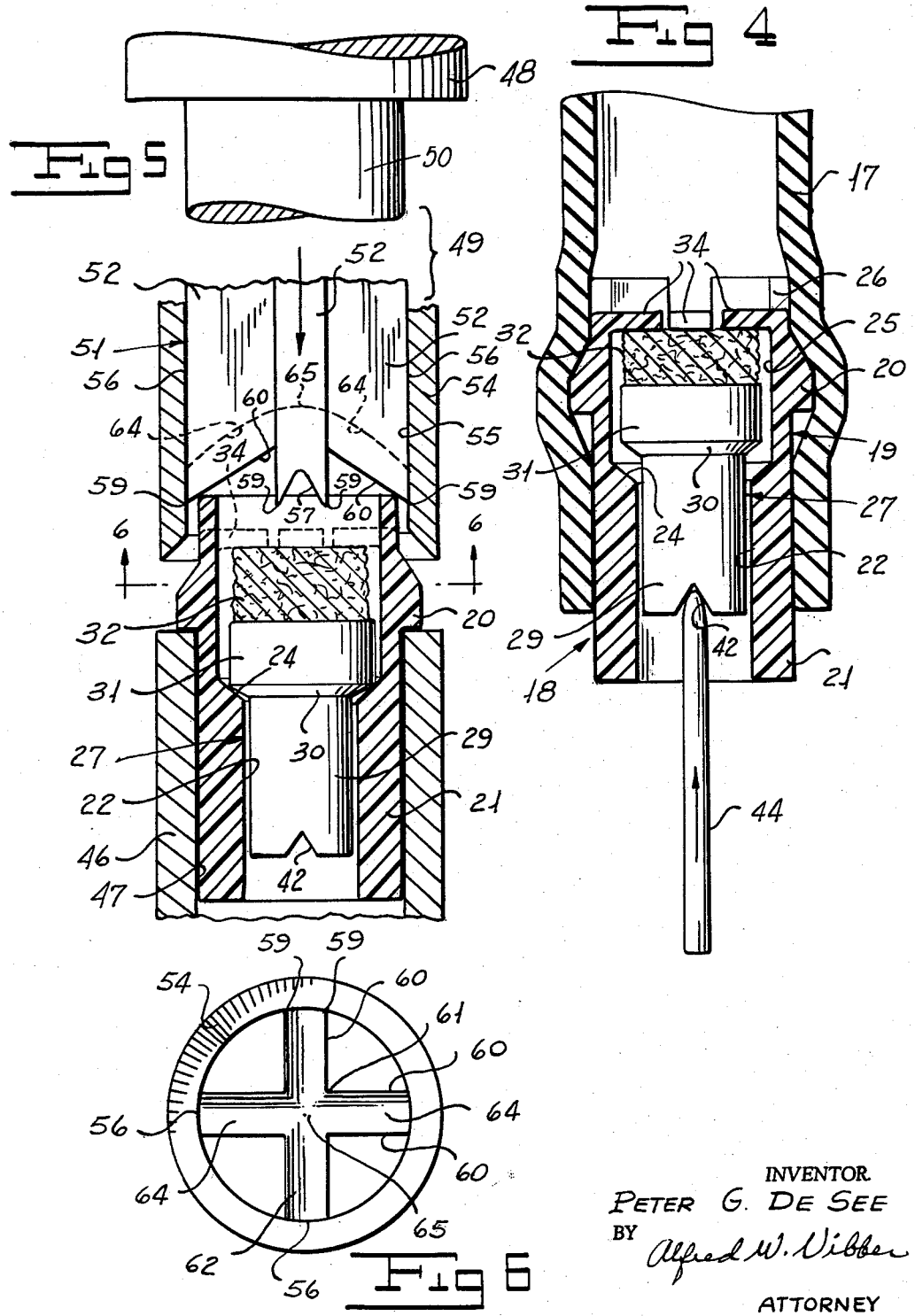

3,192,949
SPRING BIASED CHECK VALVE
Peter G. De See, Hawthorne, N.J., assignor to Halkey-Roberts Corporation, Paramus, N.J., a corporation of New Jersey
Filed July 10, 1962, Ser. No. 208,844
4 Claims. (Cl. 137—540)

This invention relates to a valve, and more particularly relates to an inflation valve of the check type adapted selectively to pass or to check the passage therethrough of a fluid. In the illustrative embodiment described herein the valve controls the flow of water from an inflatable balloon-like catheter-retaining portion of a catheter; it is to be understood that the valve of the invention is capable of use to advantage in a variety of other applications, as will be more particularly pointed out hereinafter.

The invention has among its objects the provision of an improved, simplified valve.

A further object of the invention lies in the provision of a valve of the type described which has an improved, more positive sealing action under conditions of moderate pressure applied to thrust the sealing portions of the valve together.

Another object of the invention is the provision of a check valve which is easily manipulated, both to inflate and to deflate an inflatable article with which the valve is associated.

Yet another object of the invention is the provision of a valve of the type described, the parts of which are economically made and easily assembled.

A still further object of the invention is the provision of novel apparatus for further shaping the body of the valve, after assembly of its parts, to form a valve element-retaining abutment means thereon.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in elevation of a male catheter with which the illustrative embodiment of valve made in accordance with the present invention is shown employed, an intermediate portion of the catheter being broken away for economy of space in the illustration of the catheter, an inflation syringe being shown about to be applied to the valve;

FIG. 2 is a fragmentary view in axial section through the valve of FIG. 1 and of the end of the tube within which such valve is telescoped, certain of the parts being shown in elevation, the forward or nozzle end of the inflating syringe about to be applied to the valve being shown;

FIG. 3 is a view in plan of the upper or inner end of the valve, the view being taken from a point of view at line 3—3 of FIG. 2;

FIG. 4 is a view in axial section through the valve and the tube in which the valve is mounted similar to FIG. 2, the valve element, however, being shown in elevated or retracted, inflatable element-deflating position;

FIG. 5 is a fragmentary view in longitudinal axial section through a valve in the process of its final assembly by apparatus in accordance with the invention, parts of the valve and of the apparatus being shown in elevation, parts of the apparatus being broken away for economy of space in illustration; and FIG. 6 is a view in bottom plan of the operative end of the valve body-shaping tool of FIG. 5, the view being taken from a point of view along line 6—6 of FIG. 5.

The male catheter with which the illustrative embodiment of valve of the invention is illustrated may be one made, for example, in accordance with U.S. Patent No. 2,320,157 to Raiche. One such catheter is shown in FIG. 1, where it is generally designated by the reference character 10; it has an elongated inner rubber tube 11 which has a rounded tip at the end of its inner end portion 12, which is adapted to be introduced in the bladder of a patient through the urethra. Two drainage openings 14 through the wall of end portion 12 are shown; urine passes through openings 14, along tube 11, and to further tubing (not shown) attached to enlarged outer end portion 23 of tube 11.

The catheter shown is of the type which remains in place in the patient for an appreciable period of time. To secure the catheter in place, there is provided an outer rubber tube 15 telescoped over the inner tube 11, tube 15 terminating in a thin weakened portion 16, the inner end of which is sealed to the outer surface of tube 11 adjacent tip 12 of the catheter. The outer end of tube 15 is sealed to the outer surface of inner tube 11 adjacent portion 23 of the latter. A branch tube 17 is connected to the catheter so that the passage in tube 17 communicates with the space between tubes 11 and 15 and thus the space within zone 16 of the outer tube. A check valve 18, made in accordance with the invention, is sealingly connected to tube 17 by being telescoped within the outer end of such tube.

In use, the tip 12 of the catheter is inserted in the urethra, the catheter then being progressively thrust inwardly until the tip 12 and zone 16 thereof lie within the bladder. Fluid such as water is then injected through valve 18 into tube 17 and then between tubes 11 and 15, sufficient water being thus injected to inflate the portion 16 of the catheter into a balloon-like enlargement 16' which prevents withdrawal of the catheter from the bladder. The valve 18 functions as a check valve preventing the discharge of water from enlargement 16', and thus the release of the catheter, until such action is desired.

The construction of valve 18 and the manner in which it operates are illustrated in FIGS. 2, 3, and 4. As there shown, the valve has a generally circular cylindrical hollow body 19; body 19 is relatively hard and unyielding, being made, for example, of a plastic material such as polypropylene. Body 19 has an annular rib 20 thereon, at a location nearer the inner end of the valve body, the rib being of a conventional shape, as shown, which facilitates entry of the valve body into the end of tube 17 and prevents unwanted removal of the valve from the tube.

Valve body 19 has a forward or outer portion 21 of relatively thick wall section, portion 21 having a first, smaller diametered bore 22 therein. At the inner end of bore 22 the body 19 has a frusto-conical annular valve seat 24 therein, seat 24 converging in an outer or forward direction and having its smaller diametered end meeting the axially inner end of bore 22, as shown.

In the embodiment shown, the seat 24 has an apex angle of 90°, so that elements of the seat lie at an angle of 45° with respect to the axis of bore 22. Inwardly beyond seat 24 the valve body 19 has a second, larger diametered bore 25 coaxial of bore 22 and seat 24, the axially outer end of bore 25 meeting the inner end of seat 24. The relatively thin-walled rear or inner end of body 19 surrounding bore 25 is designated 26.

The valve 18 has an inner, axially reciprocable valve element therein, such valve element being generally designated 27. Valve element 27 has a smaller diametered outer stem portion 29 which loosely but guidingly engages the wall of bore 22 in the valve body. At the inner end of stem 29 the valve element is provided with a forwardly converging annular valve seat 30 of such diameter as to engage the seat 24 on the valve body as shown in FIG. 2 when the valve element is urged forwardly as shown in such figure. Axially inwardly of seat 30 the valve element 27 is provided with a larger diametered disc-like portion 31 which is loosely received within bore 25 in the valve body. The axially inner end of stem 29 meets the outer, smaller diametered end of valve seat 30, and the outer end of portion 31 meets the inner, larger diametered end of valve seat 30, as shown.

The valve element 27 in the preferred illustrative embodiment is made of self-sustaining but relatively soft and easily deformed rubber or rubber-like material which has a hardness on the Shore A durometer scale of no greater than 40 and preferably of 35 or on the order of 35 on such scale. The valve seat 30 on valve element 27 has an apex angle which is appreciably greater than that of seat 24 on the valve body, so that the inner, larger diametered end of seat 30 initially contacts seat 24 when the valve element 27 is urged forwardly into the position of FIG. 2. In the embodiment shown, the apex angle of seat 30 of the valve element when the element is in its relaxed condition is 120°, so that elements of the seat 30 make an angle of 60° with respect to the axis of the valve element.

When the valve 18 is subjected to no appreciably outwardly directed pressure, the parts have the relationship shown in FIG. 2, wherein the valve seat 30 is in its substantially undistorted, relaxed condition, the larger diametered end of seat 30 lightly engaging the seat 24 with not much more than line contact. Valve element 27 is normally held in such position until it is called upon to check the flow of fluid therethrough, by means which lightly resiliently urges the valve element into the position of FIG. 2. In the illustrative embodiment, such means takes the form of a disc-like body 32 of resilient porous foamed plastic material, such as foamed urethane, which is held under light compression between the inner end of inner end portion 31 of the valve element and an abutment means affixed to the valve body adjacent the inner end thereof. Body 32, which is preferably of a diameter which is appreciably less than that of the bore 25 within which it is received, is very much "softer," that is, more easily resiliently distorted, than valve element 27. In the embodiment shown, four equally angularly spaced tabs 34 form such abutment means, such tabs being formed by being sheared from the wall of inner portion 26 of the valve body and bent radially inwardly to overlie and preferably lightly to compress resilient disc 32. As shown in FIG. 4, the inner ends of tabs 34 lie close to, but are spaced somewhat from, the axis of the valve.

The described construction of the valve is of advantage for a number of reasons. The valve seats 24 and 30 are normally lightly held in engagement (FIG. 2) in condition immediately to be fully sealed upon the imposition of further outwardly directed pressure on the valve element. At the same time, the pressure exerted on the valve element by resilient body 32 is insufficient to cause the resilient valve seat 30 to assume a permanent set, or to stick to valve seat 24, despite a long period of storage of the valve before its use. The resilient body 32 employed to urge the valve element outwardly toward its sealing position is less expensive and easier to handle during assembly of the valve than other resilient devices such as coil compression springs. Body 32 also provides a desirably lighter normal forwardly directed force upon the valve element than would be possible as a practical matter with a coil compression spring. Further, the resilient foamed plastic body 32 can not be damaged by handling during assembly of the valve parts, or by mistreatment of the assembled valve.

In the use of the described catheter 10, the valve 18 functions as follows: After the described insertion of the catheter, a fluid such as water is injected into portion 16 of the outer tube 15 through valve 18, as by use of a syringe 36. Such syringe has a hollow body 37 having a bore 39 within which a piston 40 is reciprocably mounted. Water held in the syringe in advance of piston 40 is ejected through a nozzle 41 on the forward end of the syringe body upon the pressing of piston 40 into such body. The nozzle 41 is generally of frusto-conical configuration, and is of such size and apex angle that when the forward end of the nozzle is thrust into the outer end of bore 22 in the valve body, the nozzle makes a substantial seal with the valve body. Upon injecting water from the syringe into the valve, the pressure of the injected water forces valve element 27 rearwardly, thereby permitting water to flow inwardly between stem 29 and bore 22, between the separated valve seats 24 and 30, between portion 31 of the valve element and bore 25, around and through resilient body 32, and into tube 17.

Upon the injection of sufficient water into tube 17 the pressure in tube 15 builds up sufficiently to inflate portion 16 of such tube to produce the catheter-retaining balloon-like formation 16'. When this has been achieved, the syringe 36 is withdrawn from valve 18. The resilience of body 32 and the back pressure of the water in the inflated formation immediately thrust the valve element 27 into valve-closed position, with the loss of but little water outwardly from the valve. The increase in force, caused by such back pressure, with which the valve element is now thrust into its valve-closed position causes the resilient valve seat 30 to be deformed so that the seats 24 and 30 engage each other over a frusto-conical zone of appreciable width. The width of such sealing zone varies, within limits, approximately directly with the back pressure applied to the valve element, so that for greater back pressures there is a greater effective sealing area, although the pressure upon units of sealing area of seats 24 and 30 remains substantially constant.

When it is desired to release the fluid in inflated portion 16' of the catheter, the valve element 27 is thrust rearwardly. This may be done by a rod, such as shown at 44 in FIG. 4, such rod being inserted in the outer end of the valve. To facilitate a desirable central location of the deflation rod with respect to the valve element, the outer end of stem 29 of the valve element may be provided with a centrally located, inwardly converging, transverse V groove 42, into which the inner end of rod 44 may be inserted, as shown in FIG. 4.

The body 19 and the valve element 27 of the valve 18 may conveniently be made by being molded of plastic and rubber or rubber-like materials, respectively, having the above-indicated properties. The resilient disc-like body 32 may conveniently be formed by transversely cutting a rod resilient foamed plastic material of the requisite diameter. The valve of the invention lends itself admirably to assembly by automatic machinery. Thus valve bodies 19 may be automatically oriented and fed in the upright position of FIG. 5 to a station where a valve element 27 is automatically dropped into each such valve body. The assembled valve body and valve element may then be forwarded, still in upright position, to another station where a resilient body 32 is dropped in the proper position into the upper end of the valve body. Such assembly may then be automatically delivered to yet another station, somewhat schematically shown in FIG. 5, where the tabs 34, which retain valve element 27 and resilient body 32 in the valve body, are formed.

In FIG. 5 a valve body 19 is shown held in a fixed vertical supporting member 46. Member 46 has a bore 47 therein which accurately receives the forward end of the valve body 19 therein, the annular rib 20 on the valve body resting upon the upper edge of support 46. The tab-forming apparatus has a plunger 48 driven by means not shown to reciprocate along a vertical axis aligned with the axis of support 46 and thus of the valve body 19 held thereby. Connected to plunger 49 to reciprocate therewith is a tab-forming and bending tool, generally designed by the reference character 49.

Tool 49 has a circular cylindrical shank 50 at its upper end and a lower end portion 51 having a plurality (four shown) of equally angularly spaced radically deep lands 52, as more clearly shown in FIG. 6. The peripheral surface 56 of each of land 52 is in the form of a part of a circular cylinder coaxial of tool 49, the lower end of the tool being accurately telescoped within a sleeve-like stripper 54 having a tool-receiving bore 55 therethrough. The stripper 54 and the bore 55 therethrough are of such diameter that the lower end surface of the stripper overlies the annular rib 20 on the valve body, thus to strip the valve body from tool 49 after the tool in its downward stroke has formed the tabs 34 on such body and as the tool is rising following such downward stroke. Conventional means, not shown, connecting the tool and stripper may be employed whereby the tool and stripper rise together, carrying with them the formed valve which frictionally engages the lower, operative end of the tool, a sufficient distance to withdraw the valve from support 46, following which the stripper is held against further upward movement as the tool continues to rise, thereby stripping the valve from the tool.

Each of lands 52, at the lower, operative end thereof, has the following configuration. The lower end surface of the land 52 has a symmetrical, elongated upwardly converging generally V-shaped groove therein extending generally radially of the tool, the elongated groove extending to the vertical side edges of the peripheral surface 56 of the land so that such peripheral surface of the land has an inverted V-shaped groove 57 with two peripherally spaced points 59 at its lower end. The apex of the elongated inverted V-shaped groove is somewhat rounded, as shown. The points 59 on surface 56 are radially outer termini of parallel cutting edges 60 at the lower, generally radially directed edges of land 52; laterally inwardly of each of cutting edges 60, the lower side surfaces 62, 62 and the central valley 64 of land 52 form a surface which is of generally the same section, transverse to the radial dimension of the land, as the V-shaped groove 57, as shown in FIGS. 5 and 6. Adjacent cutting edges 60 meet at intersections 61, as shown in FIG. 6. The valleys 64 in the lower, operative ends of the four lands 52 meet in a central surface 65. The cutting edges 60 lie along the surface of an imaginary frustum of a cone of large apex angle which axis lies coaxial of the tool 49. The valleys 64 in the lands 52 are slightly curved, as shown in FIG. 5, but in general parallel the cutting edges 60.

The cutting edges 60 of the tool 49 are of such effective length that their peripheral edges extend somewhat radially beyond the outer edge of portion 26 of the valve body, as shown in FIG. 5. When the tool descends in an operative stroke, the cutting edges 60 of the tool first engage the outer upper edge of portion 26 of the valve body. Continued descent of the tool causes the cutting edges 60 progressively to cut into or shear portion 26 of the valve body along vertical parallel lines, the material of portion 26 between such lines of cutting forming tabs. The tabs are progressively bent radially inwardly and downwardly by engagement between them and the surfaces 62, 62, and 64 between each pair of cutting edges. Descent of the tool 49 continues until the thus formed tabs 34 project generally radially inwardly to overlie and preferably lightly to compress the resilient body 32.

Tabs 34 remain stably in such final position, despite the subjection of the assembled valve to sterilizing temperatures. The tabs appear to be held in such final position, at least in part, by the frictional engagement between the cut edges of portion 26 of the valve body bordering the tabs and the side edges of the tabs at and adjacent their roots.

Although only one embodiment of the valve of the invention and one embodiment of apparatus for performing the final step in the assembly of the illustrative valve have been illustrated in the accompanying drawings and described in the foregoing specification, it is to be especially understood that various changes, such as in the relative dimensions of the parts, materials used, and the like, as well as the suggested manner of use of the valve and the valve assembling apparatus of the invention, may be made therein without departing from the spirit and scope of the invention as will now be apparent to those skilled in the art.

What is claimed is:

1. A check valve having a body made of hard, substantially unyielding material, said body having a rear and a forward end, a passage through the body from its rear to its forward end, a first annular seat converging in the direction toward the forward end of the body longitudinally of the passage and disposed on the inner wall of the passage transversely to the axis thereof, the first part of the passage, rearwardly of the larger diametered end of the first seat, having a first, larger diameter, the second part of the passage, forwardly of the smaller diametered end of the first seat, having a second, smaller diameter, a valve element in the passage in the body, said valve element being made of relatively soft resilient rubber-like material, the valve element having a second annular seat thereon converging in the same direction as the first seat, the first and second seats being adapted to seal the passage against escape of fluid outwardly therethrough when the valve element is thrust forwardly and to permit the flow of fluid through the passage when the valve element is moved rearwardly with respect to the valve body, the valve element having first and second parts which loosely but guidingly are engaged by the first and second parts, respectively, of the passage, the said first part of the valve element extending a substantial distance into the first part of the passage for selective engagement by a valve element unseating member introduced into the outer end of the second part of the passage, abutment means on the valve body spaced rearwardly beyond the first, larger diametered part of the valve element, and means lightly resiliently urging the valve element forwardly toward its sealing position comprising a disc-like body of resilient porous foamed plastic material interposed between the abutment means and the first, larger diametered part of the valve element, said disc-like body overlying a predominant portion of the area of said first part of the valve element.

2. A check valve as defined in claim 1, wherein the abutment means comprises at least one tab integral with the side-wall of the valve body in that portion thereof which is spaced beyond the second, larger diametered part of the valve element in said second direction, said tab extending at least partially across the disc-like resilient body.

3. A check valve as defined in claim 2, wherein the tab extends generally radially of the valve body.

4. A check valve as defined in claim 2, comprising a plurality of generally equally angularly spaced tabs extending generally radially of the valve body, the radially inner ends of the tabs lying close together adjacent the axis of the valve body.

References Cited by the Examiner

UNITED STATES PATENTS

| | | | |
|---|---|---|---|
| 1,389,019 | 8/21 | Tracy | 153—2 |
| 1,640,620 | 8/27 | Shaff. | |
| 2,197,271 | 4/40 | Kerrick | 137—540 |
| 2,292,673 | 8/42 | Taylor | 137—540 |
| 2,401,237 | 5/46 | Gamble. | |
| 2,646,059 | 7/53 | Wittner et al. | 135—525 X |
| 2,673,062 | 3/54 | Cornelius | 137—540 |
| 2,822,817 | 2/58 | Benzel | 137—543.23 X |
| 2,830,642 | 4/58 | Wallberg | 153—2 |
| 2,832,562 | 4/58 | Myers | 251—368 XR |
| 2,865,596 | 12/58 | Monnig | 251—368 XR |
| 2,900,999 | 8/59 | Courtot | 251—334 X |
| 2,910,998 | 11/59 | Davis | 137—375 |

FOREIGN PATENTS 978,757  11/50  France.

ISADOR WEIL, *Primary Examiner.*

WILLIAM F. O'DEA, MARTIN P. SCHWADRON, *Examiners.*